(12) United States Patent
Durig et al.

(10) Patent No.: US 7,702,329 B1
(45) Date of Patent: Apr. 20, 2010

(54) TEMPORARILY OVERRIDING A PREFERRED ROAMING LIST (PRL) IN A MULTI-MODE DEVICE, IN FAVOR OF A WIRELESS LOCAL AREA NETWORK (WLAN) ACCESS POINT

(75) Inventors: Dan Durig, Olathe, KS (US); Robert C. Lamb, Blue Springs, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 1083 days.

(21) Appl. No.: 11/366,130

(22) Filed: Mar. 2, 2006

Related U.S. Application Data (60) Provisional application No. 60/662,232, filed on Mar. 16, 2005.

(51) Int. Cl.
*H04W 4/00* (2009.01)
(52) U.S. Cl. .................................... 455/432.1
(58) Field of Classification Search .............. 455/434, 455/432, 435
See application file for complete search history.

(56) References Cited

U.S. PATENT DOCUMENTS

| | | | |
|---|---|---|---|
| 6,622,017 B1 | 9/2003 | Hoffman | |
| 6,625,451 B1 * | 9/2003 | La Medica et al. | 455/434 |
| 7,283,507 B2 | 10/2007 | Buckley et al. | |
| 7,349,695 B2 * | 3/2008 | Oommen et al. | 455/432.1 |
| 2005/0261970 A1 | 11/2005 | Vucina et al. | |
| 2006/0209773 A1 * | 9/2006 | Hundal et al. | 370/338 |

OTHER PUBLICATIONS

Non-Final Office Action from U.S. Appl. No. 11/366,795, mailed Jun. 12, 2008.
Non-Final Office Action from U.S. Appl. No. 11/366,795, mailed Dec. 15, 2008.
Non-Final Office Action from U.S. Appl. No. 11/366,781, mailed Jun. 12, 2008.
Non-Final Office Action from U.S. Appl. No. 11/366,781, mailed Dec. 16, 2008.
Unpublished U.S. Appl. No. 11/366,781, entitled "User-Initiated Over-the-Air Update of a Preferred Roaming List (PRL) in a Multi-Mode Device," filed Mar. 2, 2006 in the name of Dan During.
Unpublished U.S. Appl. No. 11/366,795, entitled "Automatic Over-the-Air Updating of a Preferred Roaming List (PRL) in a Multi-Mode Device, Based on an Account Association Between the Device and a Wireless Local Area Network (WLAN) Access Point," filed Mar. 2, 2006 in the name of Dan Durig.

(Continued)

*Primary Examiner*—David Q Nguyen (57) ABSTRACT

Methods and multi-mode devices are provided for temporarily overriding a preferred roaming list (PRL) in a multi-mode device, in favor of a wireless local area network (WLAN) access point. A triggering event is detected. In response to detecting the triggering event: (i) a first connection with a first WLAN access point is established; (ii) the multi-mode device is authenticated with the first access point; (iii) access data corresponding to the first access point is stored; and (iv) the PRL is deactivated for a discrete time period, such that, during the time period, the device does not use the PRL to seek to establish a second connection with any communication system. After the time period, the PRL is automatically reactivated.

17 Claims, 7 Drawing Sheets

OTHER PUBLICATIONS

Unpublished U.S. Appl. No. 12/501,747, entitled "Automatic Over-the-Air Updating of a Preferred Roaming List (PRL) in a Multi-Mode Device, Based on an Account Association Between the Device and a Wireless Local Area Network (WLAN) Access Point," filed Jul. 13, 2009 in the name of Dan Durig.

Final Office Action from U.S. Appl. No. 11/366,781, mailed Jun. 8, 2009.

* cited by examiner

TEMPORARILY OVERRIDING A PREFERRED ROAMING LIST (PRL) IN A MULTI-MODE DEVICE, IN FAVOR OF A WIRELESS LOCAL AREA NETWORK (WLAN) ACCESS POINT

CROSS-REFERENCE TO RELATED APPLICATIONS

This application claims priority to U.S. Provisional Patent Application No. 60/662,232, filed Mar. 16, 2005.

BACKGROUND

1. Technical Field

The present invention relates to wireless communications and, more particularly, to detecting and accessing radio networks.

2. Description of Related Art

More people than ever are using mobile stations, such as cell phones and personal digital assistants (PDAs), to connect to wireless wide area networks (WWANs), which are also referred to as cellular wireless communication systems, cellular wireless networks, and by other names. WWANs typically provide both voice and packet-data communication using a wireless communication format such as Code Division Multiple Access (CDMA), or another format.

Mobile stations (such as cell phones) typically store a "preferred roaming list" (PRL), which includes a prioritized listing of communication systems (such as WWANs) that the mobile station may access. In a CDMA system, for instance, a PRL typically includes (i) an acquisition table that instructs the mobile station which radio frequency (RF) channels to search and (ii) a system table that specifies, for each allowed system, a respective system identification code (SID) and network identification code (NID). Each CDMA base station broadcasts its SID and NID in system overhead messages. Thus, when a mobile station detects an allowed SID-and-NID combination, the mobile station may connect to the identified system.

In practice, an initial or default PRL is typically loaded into a mobile station before a wireless carrier distributes the mobile station to a subscriber. The carrier may thereafter load a new PRL into the mobile station at a customer service center or over the air, using over-the-air service provisioning (OTASP), as defined by industry standard EIA/TIA IS-683-C, "Over-the-Air Service Provisioning of Mobile Stations in Spread Spectrum Systems," published Mar. 20, 2003, which is incorporated herein by reference. In operation, then, mobile stations connect with various WWANs listed on their PRLs according to the listed priorities, and perhaps according to other decision logic and arbitration logic stored in the mobile station.

In addition to WWANs, wireless local area networks (WLANs) are becoming increasingly popular. WLANs typically cover an area that is geographically smaller than that covered by a typical WWAN, and often provide a signal in that area that is superior to that provided by the WWAN. For example, a WLAN may cover a single residence (such as an apartment), a single building, or a proximally-located group of buildings, perhaps on a corporate or academic campus. WLANs typically provide one or more "access points," which provide a wireless coverage area and access to a packet-data network. A common use of a WLAN is packet-data communication by a wireless-communication-capable laptop computer, or perhaps by another device such as a digital video recorder (DVR) or another appliance or computer. A commonly-used protocol for wireless communication between and among these access points and devices is IEEE (Institute of Electrical and Electronics Engineers) 802.11x Recently, the telecommunications industry has witnessed widespread growth in the area of voice-over-IP (VoIP) technology; that growth, combined with the ever-increasing prevalence of mobile stations engaging in packet-data communication generally, has caused the industry to begin to introduce mobile stations ("multi-mode devices") that are equipped to engage in both (i) voice and packet communications via WWANs (using, e.g., CDMA) and (ii) packet-data communications (including VoIP communications) via WLANs (using, e.g., IEEE 802.11x).

In one arrangement, for instance, a cellular wireless carrier may operate a gateway that provides connectivity between a packet-switched network and the wireless carrier's transport and signaling networks. The carrier may then distribute to its subscribers multi-mode devices, which may be capable of communicating in a WWAN mode with one or more types of WWANs and of communicating in a WLAN mode with one or more types of WLANs.

When a multi-mode device is within the coverage area of the carrier's WWAN infrastructure, the device may operate conventionally as a standard cellular telephone, with signaling passing through the carrier's signaling network and bearer data passing through the carrier's transport network. When the multi-mode device moves into the coverage area of a WLAN access point, on the other hand, the device may engage in IP-based signaling and IP-based bearer communication with the carrier's gateway, which may then interface the signaling and bearer communications with the carrier's signaling and transport networks.

PRLs can be extended to the context of multi-mode devices. In particular, a PRL stored by a multi-mode device may list (in the acquisition table) one or more WLAN frequencies and (in the system table) one or more WLAN service set identifiers (SSIDs) (each, in effect, an identifier of a WLAN system) that the multi-mode device may access. More particularly, for each WLAN access point that the multi-mode device is allowed to access, the PRL may list an SSID and MAC (Media Access Control) address of the access point. Thus, when the multi-mode device enters the coverage area of such a WLAN, the device may detect an SSID authorized by its PRL, and may responsively work to associate with the access point.

In general, a multi-mode device may enter the coverage area of a particular WLAN access point that may or may not be listed on the device's PRL. Independent of whether the device's PRL authorizes the device to use this particular WLAN, the multi-mode device may be capable of such access, perhaps for free (such as at a friend's apartment), or perhaps for a fee (such as in an airport or coffee shop). And, this particular WLAN access point may, at that location, provide a stronger signal, less expensive communication, or some other advantage over the WWANs and perhaps one or more WLANs found on the device's PRL. It may, therefore, be advantageous for the multi-mode device to be able to communicate via the particular WLAN—and not via a WWAN or another WLAN listed on the device's PRL—for some amount of time.

SUMMARY

Methods and multi-mode devices are provided for temporarily overriding a PRL in a multi-mode device, in favor of a WLAN access point. In response to some triggering event (such as a user command or the detection of a WLAN access point followed by user approval), a multi-mode device may establish a connection with a given WLAN access point. Once that connection is established, the multi-mode device may deactivate its PRL for a limited period of time. While the PRL is deactivated, the multi-mode device will communicate exclusively via the given WLAN access point, and will not use its PRL to seek to establish a connection to any of the communication systems (WWANs and/or WLANs) listed on the device's PRL.

After the limited time period, the device may then reactivate its PRL, at which point the device may continue to communicate via the given WLAN access point, or switch to communication via any of the communication systems listed on the device's PRL, according to the systems and priorities listed therein, and any applicable control logic. Essentially, the device will resume use of the PRL.

Thus, in one respect, an exemplary embodiment of the present invention may take the form of a method. In accordance with the method, a triggering event is detected. In response to detecting the triggering event: (i) a first connection with a first WLAN access point is established; (ii) the multi-mode device is authenticated with the first access point; (iii) access data corresponding to the first access point is stored; and (iv) the PRL is deactivated for a discrete time period, such that, during the time period, the device does not use the PRL to seek to establish a second connection with any communication system. After the time period, the PRL is automatically reactivated.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

As presently contemplated, a multi-mode device will be arranged to designate a set of access data for a WLAN (such as an SSID and a MAC address) as a temporary substitute for the device's PRL, so that the device can be made or allowed to access a specially designated WLAN system without the risk of switching over to a system listed on its PRL. The designated SSID may be automatically deleted (or flagged as inactive) after a certain period of time, so that the device will then once again use its carrier-defined PRL. The automatic reversion to the standard PRL after a period of time may benefit the carrier, by working to ensure that the device will continue to use the carrier's system and those of the carrier's roaming partners.

In a preferred arrangement, a multi-mode device will include logic that defines a WLAN "search" mode, similar or identical to the search mode commonly found in most conventional WLAN devices. When a user puts the multi-mode device into search mode, the device will detect an SSID and will engage in authentication with the access-point, possibly providing a username and password. Once the device is successfully authenticated, the device may then store access-data (e.g., SSID, MAC address, username, and password) for the access point (to the extent that access data is not already stored in the multi-mode device), to be used in place of the device's PRL. That is, the device will deactivate (e.g., flag as inactive) its PRL and will instead be set to gain access to the access point using the access data. After a defined period of time, such as two hours, for instance, the device will then automatically revert to using (i.e., reactivate) its PRL, and may then delete (or flag as inactive) the stored access data.

As an example application of this invention, consider a scenario where a user visits a friend's house and wishes to gain access via the friend's WLAN. The user may switch the device into search mode so that the device can detect and associate with the friend's WLAN access point; the device may then store the applicable access data and deactivate its PRL for a defined period of time. While the user is at the friend's house, the device may communicate (e.g., place VoIP calls) via the friend's WLAN access point without the risk of switching over to communication via a WWAN or another WLAN. Upon expiration of the time period, the device may then automatically revert to using its PRL instead of the particular WLAN's access data.

2. Exemplary Architecture a. Exemplary Communication System

Figure 1:
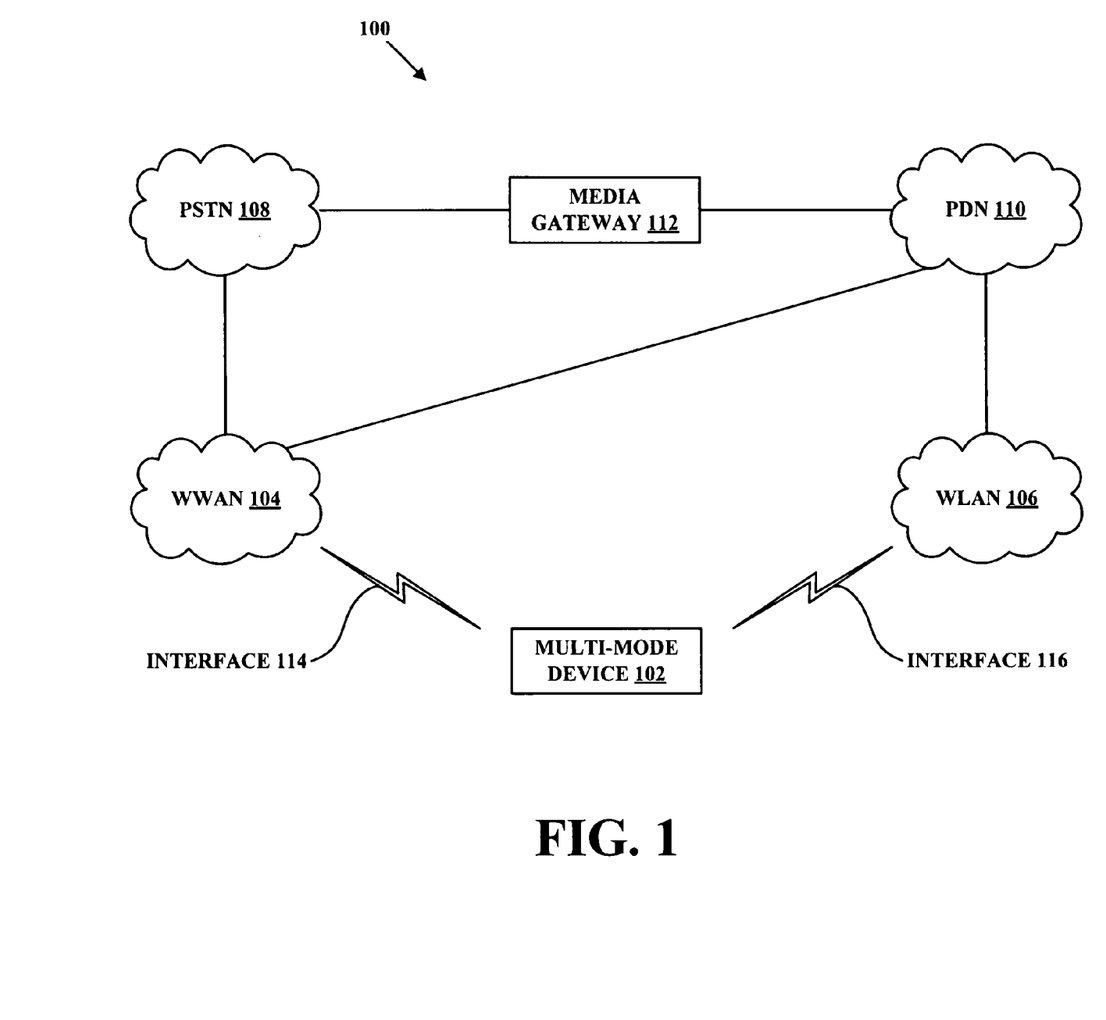
FIG. 1 is a simplified block diagram of an example of a communication system, in accordance with exemplary embodiments.

FIG. 1 is a simplified block diagram of an example of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, the communication system 100 includes a multi-mode device 102, a wireless wide area network (WWAN) 104, a wireless local area network (WLAN) 106, a public switched telephone network (PSTN) 108, a packet-data network (PDN) 110, and a media gateway 112. It should be understood that the entities depicted in FIG. 1 are illustrative. For example, there could be any number of multi-mode devices and other devices in communication with WWAN 104, WLAN 106, PSTN 108, and PDN 110. As another example, there could be any number of intermediate devices and networks making up all or part of any of the communication links shown in FIG. 1. As an example, there could be one or more routers or other devices on the communication link between WLAN 106 and PDN 110.

Multi-mode device 102 may be any mobile device capable of communicating with one or more WWANs, such as WWAN 104, and with one or more WLANs, such as WLAN 106. Multi-mode device 102 may communicate with WWAN 104 over an air interface 114 using a protocol such as CDMA and with WLAN 106 over an air interface 116 using a protocol such as IEEE 802.11. Multi-mode device 102 is described more fully in connection with FIGS. 2A and 2B, and may, in general, be any device capable of communicating with both WWANs and WLANs, and of carrying out the functions described herein. As examples, multi-mode device 102 may be a multi-mode cellular phone, multi-mode PDA, or multi-mode laptop computer.

Figure 3:
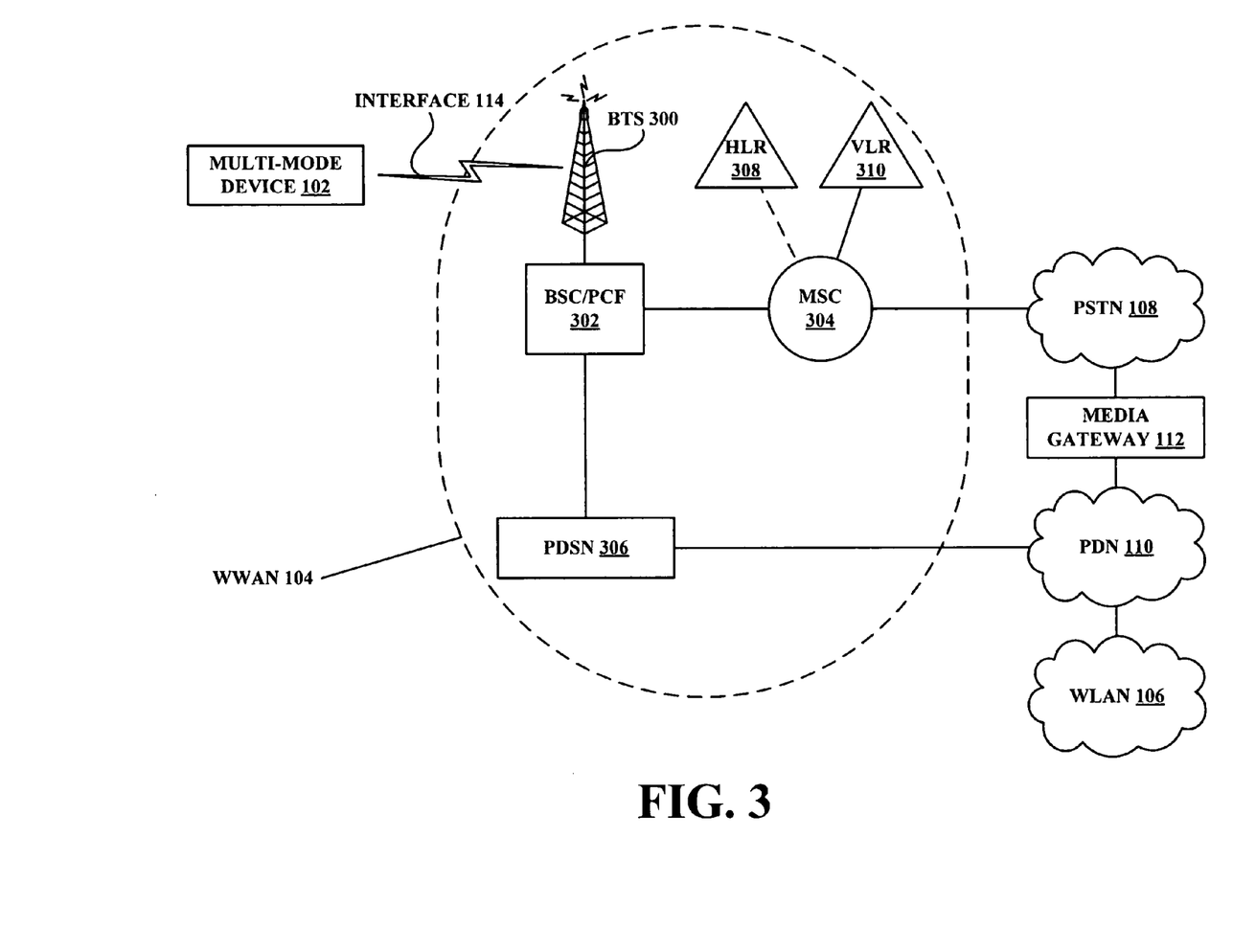
FIG. 3 is a simplified block diagram of an exemplary wireless wide area network (WWAN), in accordance with exemplary embodiments.

WWAN 104 is explained more fully in connection with FIG. 3, but in general may be a WWAN capable of communicating over air interface 114 with multiple mobile devices, such as device 102, using a wireless communication protocol such as CDMA. One such wireless format is the well-known cdma2000®, as described in "CDMA 2000® Series," TIA/EIA/IS-2000 Series, Rev. A (March 2000), which is incorporated herein by reference. WWAN 104 may be communicatively coupled with at least PSTN 108, PDN 110, and one or more mobile devices.

Figure 4:
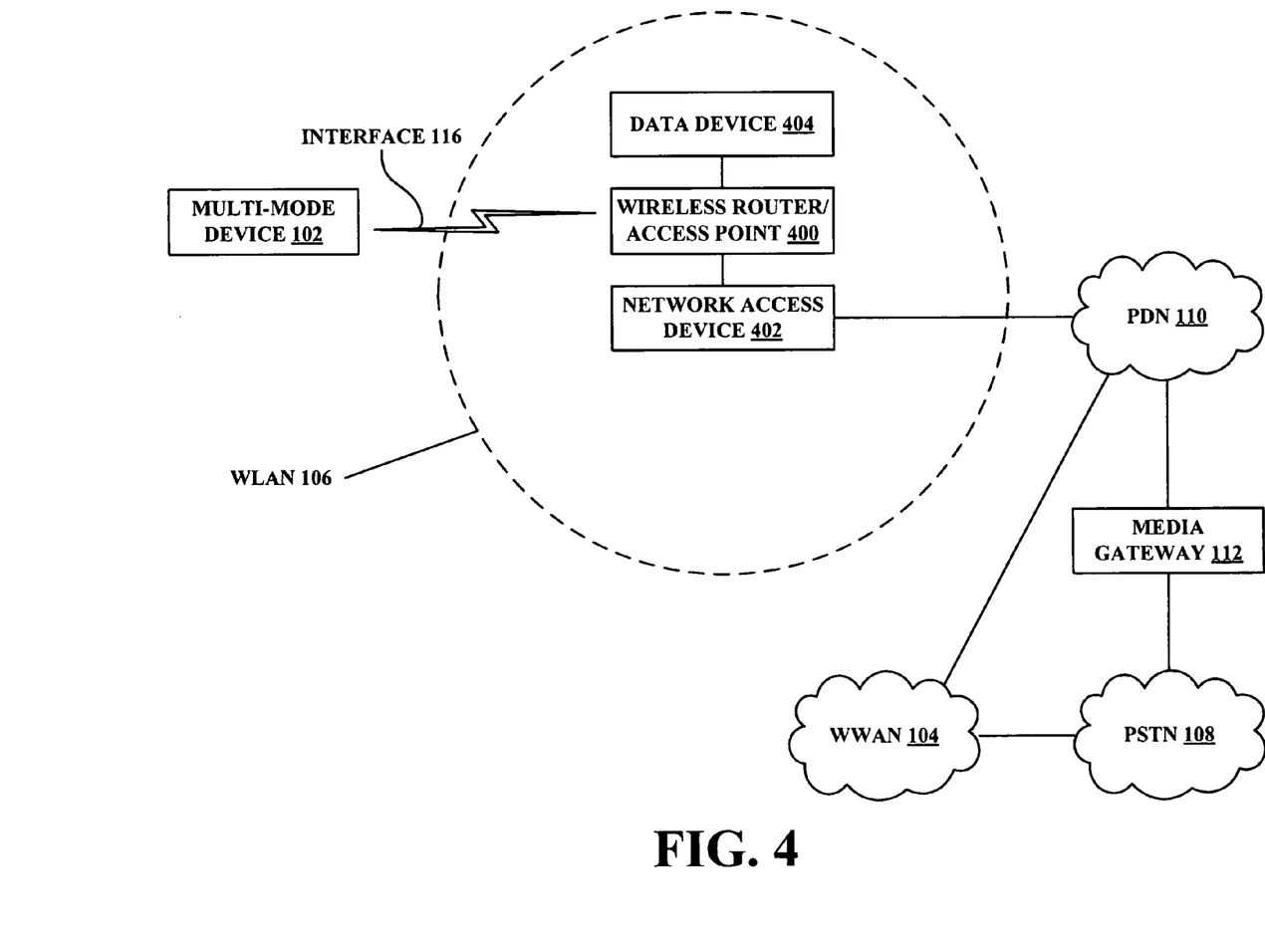
FIG. 4 is a simplified block diagram of an exemplary wireless local area network (WLAN), which may be used in accordance with exemplary embodiments.

WLAN 106 is explained more fully in connection with FIG. 4, but in general may be a WLAN capable of communicating over air interface 116 with multiple mobile devices, such as device 102, using a wireless communication protocol such as IEEE 802.11g™, as described in "IEEE Standard for Information Technology, Telecommunications and Information Exchange Between Systems, Local and Metropolitan Area Networks, Specific Requirements, Part 11: Wireless LAN Medium Access Control (MAC) and Physical Layer (PHY) Specifications, Amendment 4: Further Higher Data Rate Extension in the 2.4 GHz Band," published June 2003, which is incorporated herein by reference. The use of 802.11g™ is exemplary; other 802.11 standards and other wireless protocols could be used as well. WLAN 106 may be communicatively coupled with at least PDN 110 and one or more mobile devices.

PSTN 108 may be the well-known circuit-switched network known as the Public Switched Telephone Network, and may be communicatively coupled with at least WWAN 104 and media gateway 112. PDN 110 may be communicatively coupled with at least gateway 112, WWAN 104, and WLAN 106, and may include one or more wide area networks (WANs), one or more local area networks (LANs), one or more public networks such as the Internet, one or more private networks, one or more wired networks, and/or one or more wireless networks. Devices in communication with PDN 110 may exchange data using a packet-switched protocol such as the Internet Protocol (IP), and may be identified by an address such as an IP address.

Media gateway 112 may be a networking device (such as a server) arranged to pass communications between PSTN 108 and PDN 110. As such, media gateway 112 may have one interface for communicating with PSTN 108 and another interface for communicating with PDN 110. Gateway 112 may thus receive circuit-switched signaling and bearer communications from PSTN 108, convert those communications to a packet-based format, and transmit those communications to PDN 110. Conversely, media gateway 112 may receive packet-based signaling and bearer communications from PDN 110, convert those communications to a circuit-switched format, and transmit those communications to PSTN 108.

b. Exemplary Multi-Mode Device

Figure 2A:
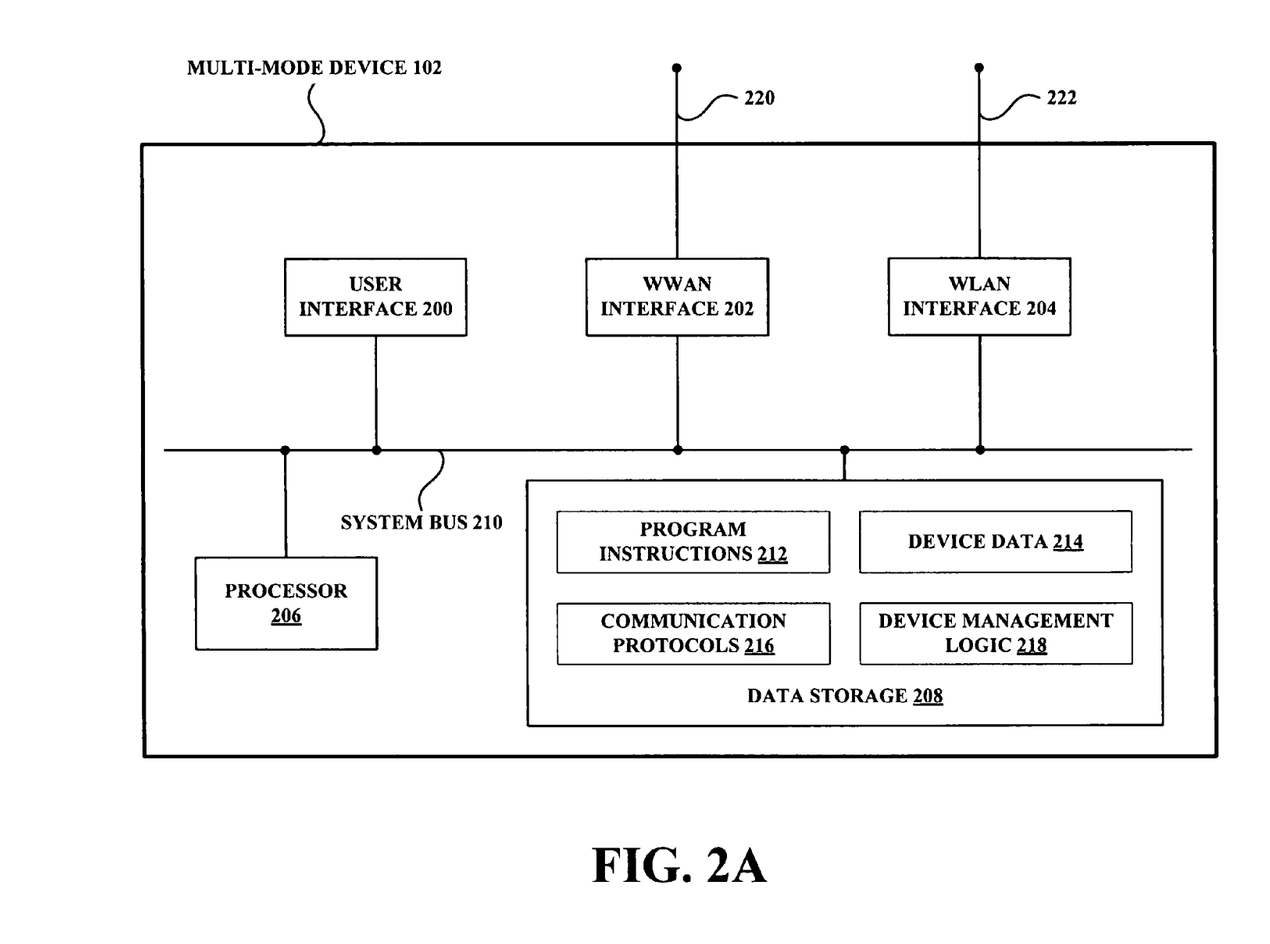
FIG. 2A is a simplified block diagram of an exemplary multi-mode device, which may be used in accordance with exemplary embodiments.

FIG. 2A is a simplified block diagram of an exemplary multi-mode device, which may be used in accordance with exemplary embodiments. In particular, FIG. 2A depicts multi-mode device 102 of FIG. 1. As shown in FIG. 2A, multi-mode device 102 includes a user interface 200, a WWAN interface 202, a WLAN interface 204, a processor 206, and data storage 208, all of which may be communicatively linked by a system bus 210. In general, device 102 may be any device arranged to communicate over air interfaces with WWANs and WLANs, and carry out the functions described herein. In this example, device 102 is a multi-mode cell phone.

User interface 200 includes one or more mechanisms for receiving inputs from users, and one or more mechanisms for communicating outputs to users. Cell phone user interfaces are known in the art, and thus are not described in detail here. Suffice it to say that user interface 200 may include buttons, a touch screen, a microphone, and any other mechanisms now known or later developed for receiving inputs, as well as an LCD or other display, speakers, and any other mechanisms now known or later developed for communicating outputs.

WWAN interface 202 may be a chipset arranged to communicate over air interface 114 with WWAN 104 according to a protocol such as cdma2000®. This chipset may then interface with an antenna 220 to facilitate communication with WWAN 104. WLAN interface 204 may be a chipset arranged to communicate over air interface 116 with WLAN 106 according to a protocol such as IEEE 802.11x. This chipset may then interface with an antenna 222 to facilitate communication with WLAN 106. It should be understood that WWAN interface 202 and WLAN interface 204 may share a common antenna. Further, the two interfaces may be integrally formed, or may in fact be a single interface, such as a single chipset capable of communication with both WWAN 104 and WLAN 106.

Processor 206 may control many operations of multi-mode device 102 by executing a set of program instructions 212 stored in data storage 208, and may comprise multiple (e.g., parallel) processors, such as a general purpose microprocessor and/or a discrete digital signal processor. Data storage 208 may store program instructions 212, device data 214 (described below in connection with FIG. 2B), communication protocols 216, and device management logic 218. Data storage 208 may take various forms, in one or more parts, such as a non-volatile storage block and/or a removable storage medium. Program instructions 212 may be executable by processor 206 to carry out various functions described herein.

Figure 2B:
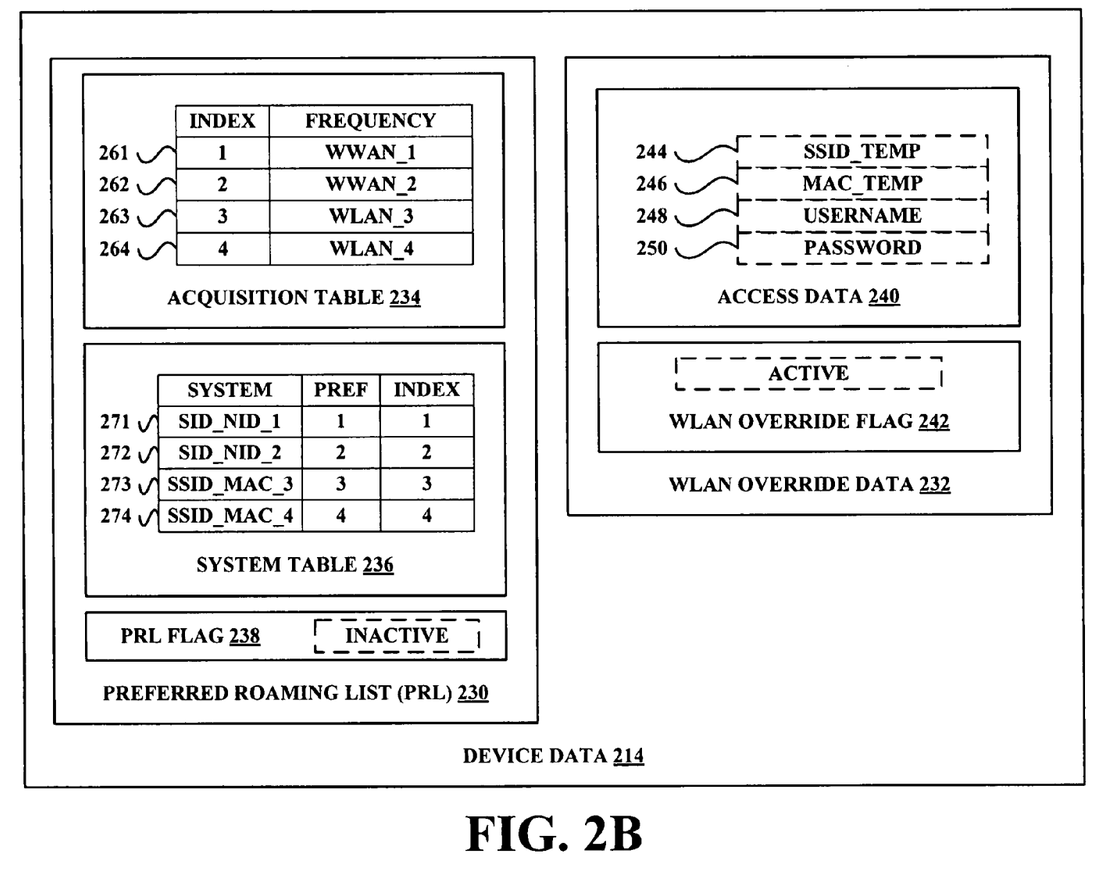
FIG. 2B is a simplified block diagram of an exemplary set of data that may be stored by a multi-mode device, in accordance with exemplary embodiments.

FIG. 2B is a simplified block diagram of an exemplary set of data that may be stored by a multi-mode device, in accordance with exemplary embodiments. In particular, FIG. 2B is a diagram of device data 214 of FIG. 2A. As shown in FIG. 2B, device data 214 comprises a preferred roaming list (PRL) 230 and WLAN override data 232. In addition to these two sets of data, device data 214 may store one or more other types of data. Furthermore, PRL 230 and WLAN override data 232 could take other forms and be stored in separate storage media, as the arrangement depicted by FIG. 2B is exemplary in nature.

PRL 230 comprises an acquisition table 234, a system table 236, and a PRL flag 238. It should be understood, however, that PRL 230 could take other forms, and store other types of data as well; furthermore, the various parts of PRL 230 could be stored in a single storage medium or in separate storage media. In this example, acquisition table 234 has four rows, each containing an index for that particular row and an RF frequency on which multi-mode device 102 may search for a communication system to which to connect. As shown in FIG. 2B, row 261 contains the index "1" and an RF channel represented "WWAN_1," indicating this is an RF frequency on which a WWAN denoted "WWAN 1" operates. "WWAN_1" is a representation; the entries in acquisition table 234 may contain numerical representations of RF channels to search. Further to this example, "WWAN 1" represents WWAN 104 of FIGS. 1 and 3.

Row 262 of acquisition table 234 contains index "2" and an RF frequency "WWAN_2," on which a second WWAN, separate and distinct from WWAN 1, operates. In the example arrangement illustrated by FIG. 2B, WWAN 1 and WWAN 2 are CDMA networks, each operating on a particular frequency or CDMA channel. As such, the frequencies listed in acquisition table 234 for those respective CDMA networks would aid multi-mode device 102 in detecting and connecting to those particular networks.

Rows 263 and 264 of acquisition table 234 list index "3" paired with a frequency for a WLAN designated "WLAN 3" and index "4" paired with a frequency for a WLAN designated "WLAN 4," respectively. The reader should bear in mind that an actual acquisition table in an actual multi-mode device could very well have many more entries than are illustrated in acquisition table 234 of FIG. 2B, as FIG. 2B is exemplary in nature.

Depicted below acquisition table 234 in FIG. 2B is system table 236. Note that the indexes listed in rows 261-264 of acquisition table 234 match the indexes listed in rows 271-274 of system table 236, and that each row 271-274 of system table 236 contains system-identifying data (under "SYSTEM"), a preference indicator (under "PREF"), and the aforementioned indexes (in the "INDEX" column). Other data may be included in a system table as well.

With respect to rows 271 and 272, system-access data is given for WWAN 1 and WWAN 2, respectively. Again, the matching index "1" in rows 261 and 271 indicate that those rows pertain to WWAN 1 and the matching index "2" in rows 262 and 272 indicate that those rows pertain to WWAN 2. As stated, WWAN 1 is, in this example, WWAN 104 of FIGS. 1 and 3. As such, WWAN 104 is listed on multi-mode device 102's PRL 230, indicating that, as a general matter, multi-mode device 102 is permitted to connect to WWAN 104. Not only that, but WWAN 104 is listed as the most preferred communication system on PRL 230 of multi-mode device 102, which is indicated by the "1" preference value in row 271.

The "SYSTEM" columns of rows 271 and 272 list "SID_NID_1" and "SID_NID_2," respectively, indicating that the "SYSTEM" entry in row 271 contains a System Identification Code (SID) and Network Identification Code (NID) for WWAN 1, and that the "SYSTEM" entry in row 272 contains a SID and NID for WWAN 2. Every CDMA system is uniquely identified by the combination of SID, NID, and Radio Frequency. It can be appreciated from FIG. 2B that, taken together, acquisition table 234 and system table 236 provide this combination for WWAN 1 and WWAN 2. And, CDMA base stations typically broadcast their respective SID and NID in system overhead messages. Thus, once device 102 detects a WWAN listed on its PRL by searching the frequency listed in acquisition table 234, the device 102 can verify the identity of the network by matching the SID and NID broadcast on that frequency to the SID and NID stored in its system table 236.

With respect to rows 273 and 274 of system table 236, system access data is given for WLAN 3 and WLAN 4, respectively. The matching index "3" in rows 263 and 273 indicate that those rows pertain to WLAN 3, while the matching index "4" in rows 264 and 274 indicate that those rows pertain to WLAN 4. In the example arrangement described herein, WLAN 106 of FIGS. 1 and 4 is neither WLAN 3 nor WLAN 4. More explicitly, WLAN 106 is not listed on PRL 230 of multi-mode device 102.

Unlike the "SYSTEM" values listed in rows 271 and 272, the "SYSTEM" values listed in rows 273 and 274 of system table 236 do not list a SID or NID, as these values are inapplicable to the WLAN context; since rows 273 and 274 pertain to WLAN 3 and WLAN 4, respectively, these rows each contain an SSID and MAC address for a particular WLAN access point. Specifically, row 273 contains an SSID and MAC address for an access point in WLAN 3 while row 274 contains an SSID and MAC address for an access point in WLAN 4.

Thus, in this example, PRL 230 of multi-mode device 102 contains entries for four communication systems that multi-mode device 102 is permitted to access. Namely, multi-mode device 102 is permitted to access WWAN 1 (also known as WWAN 104), WWAN 2, WLAN 3, and WLAN 4. Finally, PRL 230 contains PRL flag 238, which may be set to either "ACTIVE" or "INACTIVE." FIG. 2B depicts PRL flag 238 set to "INACTIVE." Note that, while not shown, PRL 230 may also contain information relevant to whether a roaming indication should be displayed on the user interface 200 of multi-mode device 102 while the device is connected to each respective communication system. PRL 230 may also contain a list of systems that multi-mode device 102 is specifically prohibited from accessing, as well as many other types of data.

Turning now to WLAN override data 232, that data contains access data 240 and a WLAN override flag 242. The access data contains SSID storage 244, MAC address storage 246, username storage 248, and password storage 250. Access data 240 is depicted in FIG. 2B with the SSID "SSID_TEMP" stored in SSID storage 244, the MAC address "MAC_TEMP" stored in MAC address storage 246, the username "USERNAME" stored in username storage 248, and the password "PASSWORD" stored in password storage 250.

These values are exemplary in nature; in general, access data 240 stores access data for multi-mode device 102 to access a particular WLAN, and may contain fewer or more values than depicted in FIG. 2B. For example, a username and password may not be necessary in some implementations. In this example, access data 240 stores access data for multi-mode device 102 to access WLAN 106. Thus, WLAN 106 has an SSID equal to "SSID_TEMP" and a MAC address equal to "MAC_TEMP," and "USERNAME" and "PASSWORD" may be supplied by a user of multi-mode device 102, or be provisioned or previously stored in multi-mode device 102.

Similar to PRL flag 238, WLAN override flag 242 may be set to either "ACTIVE" or "INACTIVE." FIG. 2B depicts WLAN override flag 242 set to "ACTIVE." In preferred embodiments, PRL flag 238 and WLAN override flag 242 will always be set to opposite values, perhaps with the exception of brief transitional periods. That is, if PRL flag 238 is set to "ACTIVE," WLAN override flag 242 will be set to "INACTIVE," and if PRL flag 238 is set to "INACTIVE," WLAN override flag 242 will be set to "ACTIVE."

Note that the presence of two Boolean flags is not necessary. That is, only one or the other of PRL flag 238 and WLAN override flag 242 may be present, and the value of that single Boolean flag may govern and be set by the various functions described herein. As another possibility, an implementation of the present invention could involve no Boolean flags at all, and the presence or absence of values in one or more of the fields of access data 240 could govern and be set by the various functions described herein. As yet another example, a single variable programmed to take on one of two possible values of an enumerated data type such as {PRL, WLAN} could govern and be set by the various functions described herein. An enumerated type having more than two values could be used as well. And many other possibilities exist.

Turning again to FIG. 2A, communication protocols 216 may be useful to receive data from and send data to WWAN 104, WLAN 106, and beyond, and may include one or more Code Division Multiple Access (CDMA) protocols such as cdma2000®, one or more Time Division Multiple Access (TDMA) protocols, Advanced Mobile Phone Service (AMPS), Global System for Mobile Communications (GSM), HyperText Transfer Protocol (HTTP), Session Initiation Protocol (SIP), Real-Time Transport Protocol (RTP), Transmission Control Protocol (TCP), User Datagram Protocol (UDP), Internet Protocol (IP), Simple Mail Transfer Protocol (SMTP), Dynamic Host Configuration Protocol (DHCP), Domain Name Service (DNS), Internet Control Message Protocol (IMCP), Point-to-Point Protocol (PPP), IEEE (Institute of Electrical and Electronics Engineers) 802.11x, Bluetooth®, HiperLAN, Multichannel Multipoint Distribution Service (MMDS), HomeRF, one or more proprietary protocols, and/or one or more other protocols. Compatible protocols may be stored in other entities in communication with multi-mode device 102. Device management logic 218 may be used to manage aspects of multi-mode device 102 such as memory and file management.

c. Exemplary Wireless Wide Area Network (WWAN)

FIG. 3 is a simplified block diagram of an exemplary wireless wide area network (WWAN), in accordance with exemplary embodiments. In particular, FIG. 3 is a diagram of WWAN 104 of FIG. 1. It should be understood that a WWAN could take many other forms as well, and that the arrangement shown in FIG. 3 is provided by way of example.

As shown in FIG. 3, WWAN 104 includes a base transceiver station (BTS) 300, a base station controller/packet control function (BSC/PCF) 302, and a mobile switching center (MSC) 304, which are arranged and coupled with each other in a manner well known in the cellular telephony field. WWAN 104 could also be referred to as a "wireless access network" or "radio access network," as devices communicate wirelessly with WWAN 104 via an RF air interface.

BTS 300 comprises a tower with antennas that radiate to define a wireless air interface 114. And BSC/PCF 302 communicates with wireless devices over that air interface according to an agreed protocol. Example air interface protocols include Advanced Mobile Phone Service (AMPS), Code Division Multiple Access (CDMA), Time Division Multiple Access (TDMA), and Global System for Mobile communication (GSM). As an example, the air interface protocol could comply with the standards IS-95 and cdma2000®, which are incorporated by reference.

MSC 304 then functions as a switch to provide connectivity with other switches in PSTN 108. Further, MSC 304 may be coupled via a signaling link with a home location register (HLR) 308 that stores service profiles for various wireless devices such as multi-mode device 102. And MSC 304 may include or be interconnected with a visitor location register (VLR) 310 that stores local copies of those profiles for wireless devices that are currently operating within the wireless coverage area of MSC 304. And although FIG. 3 shows BSC/PCF 302 and MSC 304 as separate entities, the two could instead be co-located and integrated together.

WWAN 104 enables suitably-equipped wireless devices, such as multi-mode device 102, to place and receive calls over PSTN 108 and/or over one or more other circuit-switched or packet-switched transport networks. Conventionally, multi-mode device 102 will subscribe to service with a wireless carrier that operates WWAN 104. Therefore, the carrier would have set up multi-mode device 102 to operate under a particular directory number, often known as a "mobile identification number" or "mobile directory number." In particular, the carrier would have programmed the assigned directory number into a Number Assignment Module (NAM) block of multi-mode device 102, and the carrier would have established a service-profile record in HLR 308 for that directory number/device. Further, multi-mode device 102 would have a unique electronic serial number (ESN), which may be hard coded or programmed into it.

When device 102 powers on or otherwise enters into the coverage of air interface 114, device 102 registers with MSC 304, such as by sending a registration message over an access channel and via BSC/PCF 302 to MSC 304. MSC 304, in cooperation with other network entities, would then authenticate the device, and HLR 308 would provide MSC 304 with a copy of device 102's service profile for storage in VLR 310, and for later reference by MSC 304. Thereafter, device 102 may conduct calls on PSTN 108 via WWAN 104, as is known in the art.

For providing packet-data connectivity to device 102, WWAN 104 includes a PDSN 306, and BSC/PCF 302 includes a packet control function for facilitating communication between device 102 and PDSN 306. In operation, device 102 may request packet-data connectivity by sending a packet-data origination request over an access channel to BSC/PCF 302. BSC/PCF 302 may then engage in signaling with MSC 304 and with PDSN 306, and PDSN 306 and device 102 may negotiate over a traffic channel to establish a data link, such as a point-to-point protocol connection, between device 102 and PDSN 306. After that process is successful, PDSN 306 acts as a network access server, providing device 102 with access to PDN 110.

d. Exemplary Wireless Local Area Network (WLAN)

FIG. 4 is a simplified block diagram of an exemplary wireless local area network (WLAN), which may be used in accordance with exemplary embodiments. In particular, FIG. 4 is a diagram of WLAN 106 of FIG. 1. As shown in FIG. 4, WLAN 106 includes a wireless router/access point 400, a network access device 402, and a data device 404. It should be understood that a WLAN could take many other forms as well, and that FIG. 4 is exemplary.

Wireless router/access point 400 may be any device that provides (i) a packet-data connection—such as an Ethernet connection—to network access device 402 and (ii) wired and wireless packet-data connections—such as Ethernet and IEEE 802.11x connections—to one or more devices such as device 404 and device 102. As such, wireless router/access point 400 may have an Ethernet interface for connecting to network access device 402, one or more Ethernet interfaces for connecting to other devices, and a wireless-communication interface for wirelessly connecting to devices such as device 102 over air interface 116. Wireless router/access point 400 may also have a processor and data storage for carrying out the functions described herein. As an example, wireless router/access point 400 could be the Linksys WRT54GS.

Furthermore, wireless router/access point 400 could use a protocol other than IEEE 802.11, such as any of the wireless protocols mentioned herein, or any other wireless protocol. And instead of a router/access point, just an access point could be used, in which case device 404 would connect wirelessly with that access point.

Network access device 402 may be any device that provides (i) a packet-data connection—such as an Ethernet connection—to wireless router/access point 400 and (ii) a packet-data connection to PDN 110. Network access device 402 thus functions to pass packet-data communications from PDN 110 to wireless router/access point 400, and to pass packet-data communications from wireless router/access point 400 to PDN 110. As such, network access device 402 may have interfaces for connecting with wireless router/access point 400 and with PDN 110, as well as a processor and data storage to aid in carrying out the functions described herein. Network access device 402 could, as examples, be a cable modem or DSL modem.

In the case of network access device 402 being a cable modem, the communications passing between it and PDN 110 may comply with DOCSIS packet-cable standards, or with some other standards. In that case, the link between network access device 402 and PDN 110 may include coaxial cable, fiber optic cable, one or more fiber nodes for translating between communications carried on coaxial and fiber optic cable, a cable headend, and any number of other devices. As an example, network access device 402 may be the Linksys BEFCMU10. As an alternative, wireless router/access point 400 and network access device 402 could be replaced by a single device that could carry out the functions described with respect to both.

Data device 404 may be any computing device physically or wirelessly connected to wireless router/access point 400. As examples, device 404 could be a desktop or laptop computer, another multi-mode device, a DVR, an appliance, or any other digital device capable of communicating with wireless router/access point 400. As another possibility, device 404 may not be present at all, and is included largely to show that wireless router/access point 400 can handle interfacing between network access device 402 and one or more other devices.

3. Exemplary Operation a. A First Exemplary Method

Figure 5:
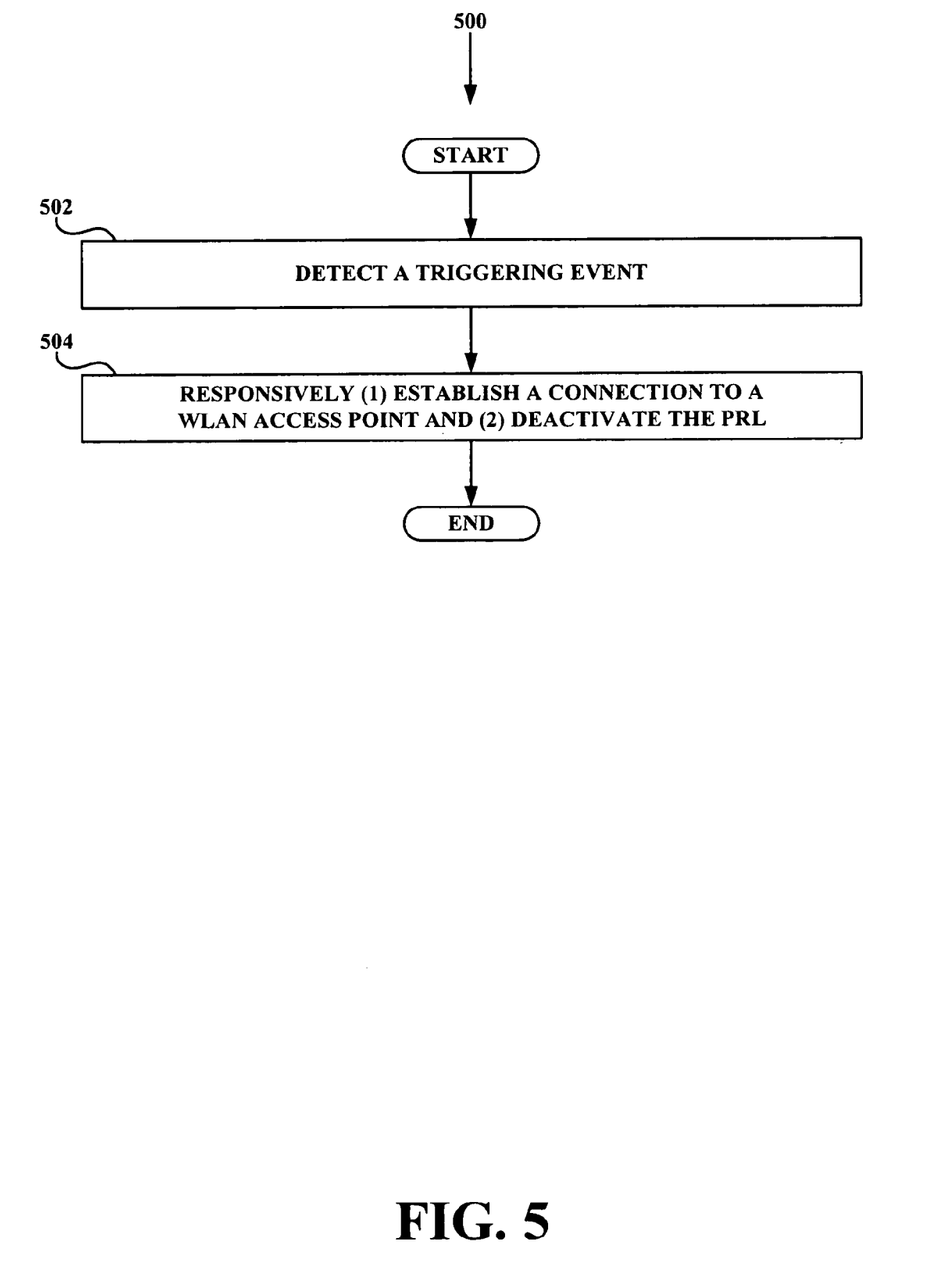
FIG. 5 is a flowchart of an exemplary embodiment, in the form of a method carried out along the communication system of FIG. 1.

FIG. 5 is a flowchart of an exemplary embodiment, in the form of a method carried out along the communication system of FIG. 1. As shown in FIG. 5, the method 500 begins at step 502, when multi-mode device 102 detects a triggering event. As a precursor to step 502, in this example, multi-mode device 102 was connected to (i.e. registered with) WWAN 104, and was subsequently moved into the coverage area of WLAN 106. Note that the coverage areas of WWAN 104 and WLAN 106 may—but do not necessarily—overlap. As such, FIG. 1 aptly represents this example, as multi-mode device 102 may, at this point, be able to communicate over air interface 114 with WWAN 104 and/or over air interface 116 with WLAN 106.

As multi-mode device 102 is, prior to step 502, registered with WWAN 104, multi-mode device 102 would have its PRL active at that point. That is, PRL flag 238 would be set to "ACTIVE," and WLAN override flag 242 would be set to "INACTIVE." In that state, multi-mode device 102 operates according to the decision and arbitration logic stored therein for selecting and connecting to the communication systems listed on its PRL. Here, multi-mode device 102 is connected to WWAN 104, which is referred to in FIG. 2B as WWAN 1.

Referring again to step 502 in FIG. 5, device 102 detects a triggering event. One example of this triggering event could be that a user of device. 102 places the device into a "WLAN search mode," in effect instructing device 102 to search for a WLAN access point. Responsive to this user command, device 102 searches for a WLAN access point, and detects wireless router/access point 400 ("access point 400") of WLAN 106. In this example, WLAN 106 is a wireless network operated by a friend of the user of device 102, in that friend's apartment. This is exemplary, in that WLAN 106 could also be a for-fee WLAN in an airport, for example, or any other WLAN. Device 102 detects access point 400 by searching one or more WLAN frequencies, and detecting the SSID broadcast by access point 400.

As another example of step 502, device 102 may not need to be instructed to search for a WLAN access point; rather, device 102 may be programmed to continuously or periodically search for access points. In that case, device 102 may detect access point 400 merely by virtue of being placed within access point 400's coverage area. Device 102 may then prompt its user for a command to establish a connection to WLAN 106, and may then receive such a command.

And these are merely examples of possible triggering events that multi-mode device 102 may detect in step 502. Other examples are possible as well, such as other ways in which multi-mode device 102 may detect access point 400, and other sequences of user commands to attempt to establish a connection to access point 400 of WLAN 106.

At step 504, responsive to detecting the triggering event in step 502, device 102 automatically carries out a number of steps. First, device 102 establishes a connection with access point 400. Device 102 may establish this connection by associating and authenticating with access point 400, as is known in the art. Device 102 may exchange one or more association messages and one or more authentication messages with access point 400. At some point during these exchanges, device 102 may provide a username and/or password to access point 400. The username and/or password may be entered by the user of device 102 via user interface 200, or be accessed by device 102 from some local or remote storage.

Second, also in response to step 502, device 102 deactivates its PRL 230, perhaps by setting PRL flag 238 to "INACTIVE" and WLAN override flag 242 to "ACTIVE," as in FIG. 2B. In this configuration, device 102 will not use PRL 230 to seek to establish a connection with any communication system. That is, device 102 will communicate, if at all, via access point 400 of WLAN 106. At this point, multi-mode device 102 may also deregister with WWAN 104.

Thereafter, device 102 may engage in one or more communication sessions over its connection with and via access point 400 with entities connected to PDN 110 and beyond. As examples, multi-mode device 102 may engage in VoIP calls with entities connected to PDN 110, calls with devices connected to PSTN 108 via PDN 110 and media gateway 112, and packet-data sessions with devices connected to PDN 110. And many other possibilities exist as well.

Device 102 may also store access data, such as an SSID and MAC address, for access point 400, as well as a username and password for gaining access. Device 102 may store this data in access data 240. Bear in mind that device 102 may already have this data stored prior to entering the coverage area of WLAN 106. For example, multi-mode device 102 may have been provisioned with this data, or perhaps have received this data via over-the-air service provisioning (OTASP), as is known in the art. Alternatively, device 102 may learn this data from messages broadcast by access point 400. And many other possibilities exist as well.

After possibly engaging in communication sessions via access point 400, device 102 may detect a second triggering event, and responsively reactivate PRL 230. The second triggering event may be the expiration of a time period, such as two hours. Another example may be a loss of signal from WLAN 106 for a timeout period, such as 30 seconds, which may correspond to a problem with WLAN 106 or to multi-mode device 102 leaving the coverage area of WLAN 106. And many other possibilities exist as well for what could represent the second triggering event.

Device 102 may reactivate PRL 230 by setting PRL flag 238 to "ACTIVE" and WLAN override flag 242 to "INACTIVE." Device 102 may then resume use of PRL 230. Device 102 may also, in response to the second triggering event, delete access data for WLAN 106 from access data 240. Finally, device 102 may alert the user that PRL 230 has been reactivated, perhaps with some sort of visible and/or audible alert message or signal.

b. A Second Exemplary Method

Figure 6:
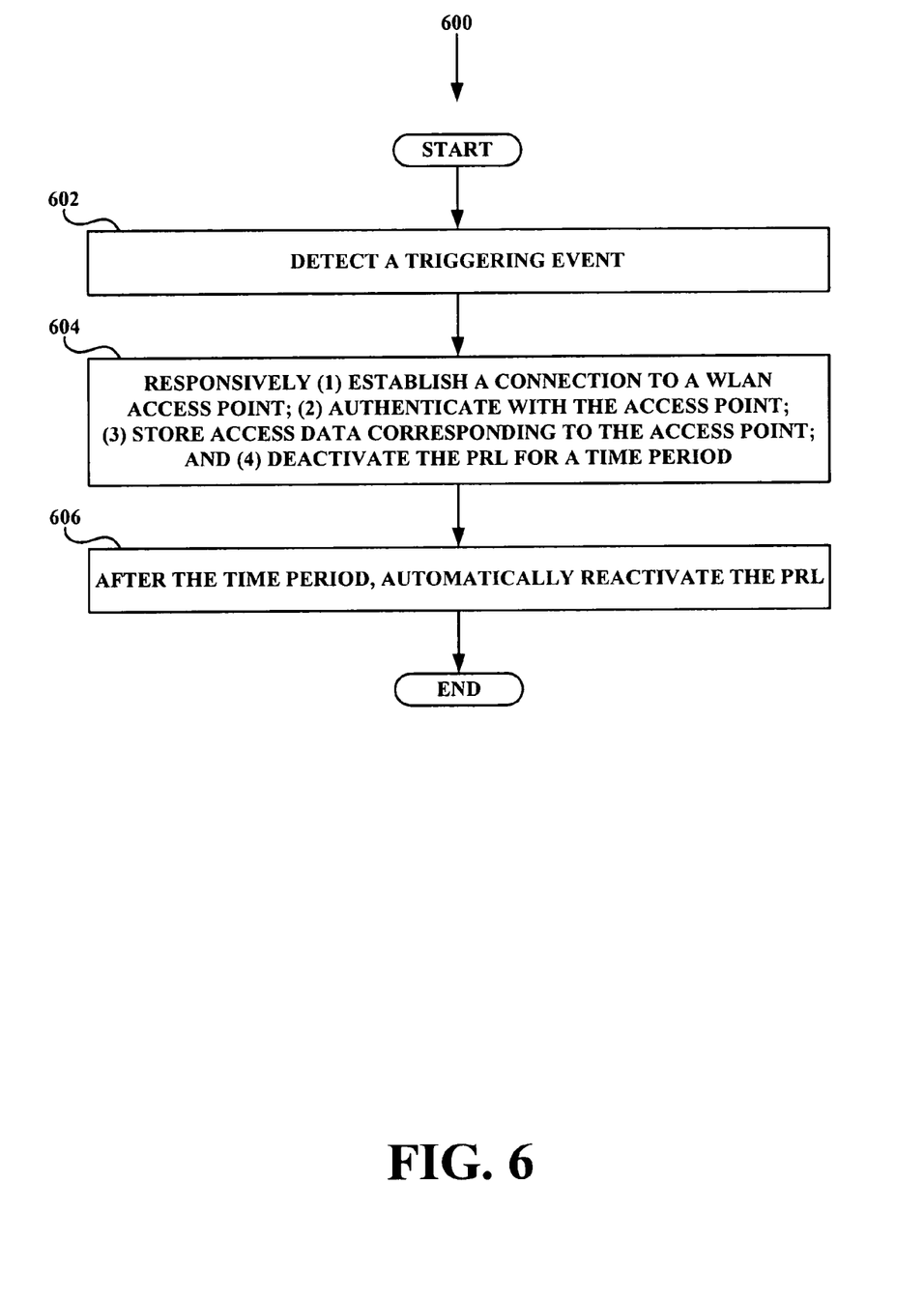
FIG. 6 is a flowchart of an exemplary embodiment, in the form of a method carried out along the communication system of FIG. 1.

FIG. 6 is a flowchart of an exemplary embodiment, in the form of a method carried out along the communication system of FIG. 1. As shown in FIG. 6, the method 600 begins at step 602, when multi-mode device 102 detects a triggering event. Step 602 may take the same form as step 502 of FIG. 5, or perhaps involve the detection of some other triggering event.

At step 604, in response to step 602, device 102, as described with respect to FIG. 5, (i) establishes a connection with access point 400, (ii) authenticates with access point 400, (iii) stores access data corresponding to access point 400 in access data 240, and (iv) deactivates PRL 230 for a discrete time period, such as two hours. Multi-mode device 102 may deactivate PRL 230 by setting PRL flag 238 to "INACTIVE" and WLAN override flag 242 to "ACTIVE." During the time period, device 102 does not use PRL 230, but may engage in one or more communication sessions over the connection with and via access point 400.

At step 606, after the time period, device 102 automatically reactivates PRL 230 by setting PRL flag 238 to "ACTIVE" and WLAN override flag 242 to "INACTIVE." Device 102 will resume use of PRL 230. After the time period, device 102 may delete the access data, and may alert the user of the reactivation of PRL 230.

4. Conclusion

Various exemplary embodiments have been described above. Those skilled in the art will understand, however, that changes and modifications may be made to those examples without departing from the scope of the claims.

What is claimed is:

1. A method comprising:
   detecting a first wireless local area network (WLAN) access point;
   prompting a user of a multi-mode device for a command to establish a first connection between the device and the WLAN access point;
   receiving a user command to establish the first connection; and
   responsive receiving the user command, the multi-mode device: (i) establishing the first connection; and (ii) deactivating a preferred roaming list (PRL) for the device, such that the device does not use the PRL to seek to establish a second connection with any communication system.

2. The method of claim 1, further comprising:
   receiving a user search command to search for the WLAN access point; and
   responsive to the user search command, searching for the WLAN access point.

3. The method of claim 1, further comprising engaging in a communication session over the first connection and via the first access point.

4. The method of claim 1, further comprising storing access data corresponding to the first access point.

5. The method of claim 1, further comprising:
   detecting a second triggering event; and
   responsive to detecting the second triggering event, automatically reactivating the PRL.

6. The method of claim 5, further comprising, also responsive to detecting the second triggering event, deleting access data corresponding to the first access point, or flagging the access data as inactive.

7. The method of claim 5, further comprising alerting a user of the reactivating of the PRL.

8. A method of temporarily overriding a preferred roaming list (PRL) in a multi-mode device, the method comprising:
   detecting a first wireless local area network (WLAN) access point;
   prompting a user of the device for a command to establish a first connection with the WLAN access point;
   receiving a user command to establish the first connection;
   in response to receiving the user command, the multi-mode device: (i) establishing the first connection; (ii) authenticating with the first access point; (iii) storing access data corresponding to the first access point; and (iv) deactivating the PRL for a discrete time period, such that, during the time period, the device does not use the PRL to seek to establish a second connection with any communication system; and
   after the time period, automatically reactivating the PRL.

9. The method of claim 8, further comprising engaging in a communication session over the first connection and via the first access point.

10. The method of claim 8, further comprising:
    receiving a user search command to search for the WLAN access point; and
    responsive to the user search command, searching for the WLAN access point.

11. The method of claim 8, further comprising, after the time period, automatically deleting the access data, or flagging the access data as inactive.

12. The method of claim 8, further comprising alerting a user of the reactivating of the PRL.

13. A multi-mode device comprising:
    a user interface;
    a wireless wide area network (WWAN) interface;
    a wireless local area network (WLAN) interface;
    a processor; and
    a data storage having stored therein a preferred roaming list (PRL) and program instructions executable by the processor to:
    detect via the WLAN interface a first WLAN access point;
    prompt a user via the user interface for a command to establish a first connection with the WLAN access point;
    receive via the user interface a user command to establish the first connection;

in response to receiving the user command: (i) establish the first connection; (ii) authenticate with the first access point; (iii) store access data corresponding to the first access point; and (iv) deactivate the PRL for a discrete time period, such that, during the time period, the device does not use the PRL to seek to establish a second connection with any communication system; and after the time period, automatically reactivate the PRL.

14. The multi-mode device of claim 13, wherein the data storage further has stored therein program instructions executable by the processor to engage in a communication session over the first connection and via the first access point.

15. The multi-mode device of claim 13, wherein the data storage further has stored therein program instructions executable by the processor to:

receive a user search command to search for the WLAN access point; and responsive to the user search command, search for the WLAN access point.

16. The multi-mode device of claim 13, wherein the data storage further has stored therein program instructions executable by the processor to delete the access data, or instructions to flag the access data as inactive.

17. The multi-mode device of claim 13, wherein the data storage further has stored therein program instructions executable by the processor to alert a user of the reactivating of the PRL.

* * * * *